United States Patent
Loosli et al.

(10) Patent No.: US 6,312,100 B1
(45) Date of Patent: Nov. 6, 2001

(54) INKJET PRINT METHOD AND INKSET FOR MULTI COLOR INKJET PRINTER

(75) Inventors: Daniel Loosli, Uster; Peter Drescher, TannIZH; Bruno Mancini, Hausen; Markus Schudel, Zürich, all of (CH)

(73) Assignee: Pelikan Produktions AG (CH)

( * ) Notice: Subject to any disclaimer, the term of this patent is extended or adjusted under 35 U.S.C. 154(b) by 0 days.

(21) Appl. No.: 09/076,342

(22) Filed: May 12, 1998

(30) Foreign Application Priority Data

May 13, 1997 (DE) .............................. 197 20 004

(51) Int. Cl.[7] .................................................. B41J 2/21
(52) U.S. Cl. ................. 347/43; 347/96; 347/100
(58) Field of Search .............. 106/31.27, 31.43; 347/43, 96, 100; 523/160

(56) References Cited

U.S. PATENT DOCUMENTS

| | | | |
|---|---|---|---|
| 5,488,402 | * 1/1996 | Shields et al. | 347/96 |
| 5,549,740 | * 8/1996 | Takahashi et al. | 106/31.27 |
| 5,679,143 | 10/1997 | Looman . | |
| 6,022,908 | * 2/2000 | Ma et al. | 523/160 |
| 6,027,210 | * 2/2000 | Kurabayashi et al. | 106/31.75 |
| 6,031,019 | * 2/2000 | Tsutsumi et al. | 523/160 |

FOREIGN PATENT DOCUMENTS 0 576 151 A2    12/1993    (EP) .
0 586 079 B1    3/1994    (EP) .

* cited by examiner

*Primary Examiner*—John Barlow
*Assistant Examiner*—Manish S. Shah
(74) *Attorney, Agent, or Firm*—Fay, Sharpe, Fagan, Minnich & McKee, LLP

(57) ABSTRACT

Description of an inkjet printing method, whereby a second and optionally a third and/or additional ink(s) is/are printed on top of each other or immediately next to each other, whereby (i) the first ink contains a coloring substance precipitable by a precipitation reagent, (ii) the first or the second ink contains the precipitation reagent in temporarily passivated form, and (iii) the first, second or third ink contains an activator for the temporarily passivated precipitation reagent, with the proviso that the temporarily passivated precipitation reagent and the activator are not present in the same ink. The method prevents or reduces the problem of mixing or running into each other of two inks at their border lines. The temporarily passivated precipitation agent can be a complexed multi-valent metal ion, which is displaced from the complex by the activator. The temporarily passivated precipitation reagent can also be a compound with pH-dependent ion strength which is activated by a proton-delivering or proton-accepting compound. The temporarily passivated precipitation reagent can also be a polyamine which is activated by protonizing or quaternizing.

20 Claims, No Drawings

INKJET PRINT METHOD AND INKSET FOR MULTI COLOR INKJET PRINTER

The present invention concerns an inkjet print method and an inkset for multicolor inkjet print.

Inkjet print specifically for so-called desk top publishing application finds growing use, which is particularly attributable to its capacity of producing in a single pass multicolored prints by means of application of three or more primary inks on one substrate. Other printing methods generally require one pass through the printer for each primary color. An important benefit of the inkjet printers is also their price.

Thermal inkjet printing systems play a particularly significant role. These have an ink reservoir with liquid-conducting connection to a print head, on which are arranged a plurality of resistors. Selective activation of resistors causes thermal excitation of the ink and its outward propulsion. Exemplary thermal inkjet print systems are described in U.S. Pat. Nos. 5 500 895 and 4 794 409.

Other systems are based on the so-called piezo technology, in which a piezo element is excited by a current impulse and a droplet of ink is thereby flung out.

By using special inkjet print heads with a plurality of individual ink compartments, it is possible to produce multicolored images. Each compartment holds a selected ink with special color properties. By combining these ink materials in varying configurations and quantities on one substrate, for example, paper, multicolored images can be produced having high resolution and clarity.

When producing multicolored images by inkjet print, a problem, however, arises if an ink of one color is applied on or in the immediate vicinity next to an ink of a different color.

The problem expresses itself by intermingling or running together of the two inks at their border region, whereby the border line between the inks becomes less sharp, for example at the outer edges. If, for example, a black image area is printed directly next to a yellow image area, one notes, in most cases, a diffusion of the black ink into the yellow ink. Unsatisfactory images with poor resolution are obtained. This phenomenon is also known to experts skilled in the area of print technology under the term "color bleeding." In addition, problems of colors running together in multiple ink systems can also be caused by capillary forces, which originate from the traditionally employed paper substrates.

These capillary forces lead to print inks being sucked into neighboring areas. This also results in a printout of poor quality and dissolution.

Different methods have already been proposed for reducing or eliminating the running together of inks at the contact lines. Thus, by more rapid penetration of ink into the to-be-printed medium, the bleeding problem should be minimized. Such more rapid penetration can be attained by addition of surface-active agents to the inks, such as Tenside wetting agents, alcohols, solvents and similar. This is proposed, for example, in U.S. Pat. Nos. 5 106 416 and 5 196 056. Such attempt of solving the problem, however, leads only to insufficient reduction of bleeding. Additional drawbacks lie in an increased "feathering," i.e., the inks now have an even greater tendency to run along the paper fibers. By more rapid penetration into the paper, that portion of the coloring material which is available on the surface of the paper becomes smaller. This leads to a reduction of the optical density and is particularly noticeable with black ink on white paper. Cohesive color surfaces no longer appear deep black but gray.

In a modification of this method, a rapidly penetrating ink is printed at the contact areas below a slowly penetrating ink. As a result, the slowly penetrating ink also penetrates at these locations more rapidly into the paper and bleeding is reduced. The printing process is hereby controlled via a special software program. The black ink is preferably the slow penetrating ink and a colored ink the rapidly penetrating ink. With this modification, overall bleeding is also insufficiently reduced. In addition, a less intensive, uneven shade of black is obtained.

In another modification, all colors are printed on top of each other at the contact areas, whereby the colored inks are quickly penetrating inks and the black inks are slowly penetrating ink. In this proposal, the optical density of the black ink is also reduced because of the more rapid penetration, which is, however, supplemented by the mixed color of the colored inks, which, based on subtractive color mixing, leads to a shade of black. The drawbacks lie here also in insufficient reduction of bleeding and in an uneven shade of black.

Another proposal is introduced in EP 0 705 889 A1, which makes use of gel-forming inks. An ink, preferably the black ink, contains a gel-forming reagent and another ink, preferably the colored ink, contains a gel-initiating reagent. With contact at the contact line, a gel barrier is formed between the two inks. The formed gel, however, dries rather slowly, which results in reduced rub-off resistance. In addition, the inks have an inadequate shelf life, since the presence of gel-forming or gel-initiating reagents causes higher risk of instability. Also, when ink dries up at the nozzle of the printer, the viscosity increases greatly, which leads to higher clogging risk.

Another "core product" is known, namely an ink set where a first ink contains a coloring substance which can be precipitated by means of a precipitation reagent. A second ink contains the precipitation reagent in addition to a second coloring substance. It is, however, of disadvantage that the precipitation reagent of the second ink must be added in high concentration, which carries with it considerable risk of instability or agglutination. The high percentage of precipitation reagent may also lead to corrosion problems. The precipitation agents are, for example, metallic salts of higher valence such as $Ca^{2+}$, $Cu^{2+}$, $Co^{2+}$, $Ni^{2+}$, etc. Selection of dyes which can be present in the second ink is very limited, since consideration can be given to only such dyes which will remain soluble or dispersed for an extended period of time in the presence of the precipitation reagent.

The present invention was therefore based on the object of making available a multicolor inkjet printing method, which does not have the above described drawbacks and for which specifically the bleeding at the contact lines of different colors has been sufficiently reduced, whereby the color shade of the printed ink is not changed, high optical density of the inks remains preserved, and the employed printing inks have adequate storage stability.

According to the invention, this task is solved by an inkjet printing method where a first, a second and, selectively, a third or additional ink is printed simultaneously or successively or immediately next to each other, whereby i) the first ink contains a via-precipitation reagent precipitable coloring substance ii) the first or the second ink contains the precipitation reagent in temporarily passivated form, and iii) the first, second or third ink contains an activator for the temporarily passivated precipitation provided that the temporarily passivated precipitation reagent and the activator are not present in the same ink.

The following combinations are possible within the scope of the invention:
(a) the precipitable coloring substance and the temporarily passivated precipitation reagent can be contained in the first ink and the activator in the second ink
(b) the precipitable coloring substance and the activator can be contained in the first ink and the temporarily passivated precipitation reagent in the second ink
(c) the precipitable coloring substance can be contained in the first ink, the temporarily passivated precipitation reagent in the second ink and the activator in the third ink.

A coloring substance is a chemical compound which is used in order to provide a printing ink with a desired color characteristic. The coloring substance can be a water-soluble dye, a pigment dispersion or a micro-emulsion. Water-soluble pigments are known substances. They may be categorized among the anionic, cationic, amphoteric or non-ionic dyes. Anionic coloring substances for colored anions in watery solution, cationic coloring substances for colored cations in watery solution. The anionic dyes generally comprise carboxyl- or sulfonic acid groups. Cationic dyes generally contain quaternary nitrogen groups or amino groups. Preferred are dyes with anionic water-solubility promoting groups, such as, for example, carboxyl- or sulfonic acid groups. As examples, one might name carboxylized azo dyes, carboxylized phthalocyanine dyes and their complexes and carboxylized xanthan dyes.

Pigment dispersions contain pigment particles, which are small enough to guarantee trouble-free flow of ink through the ink-conducting parts of the printer, specifically the printing jets, which generally have a particle size of 25 to 500 nm. The size of the particles also has an influence upon the stability of the pigment dispersion. Stabilization of dispersion can be done by superficial modification of pigments, for example, by sulfonizing, carboxylizing or introduction of amino groups. One might name as an example surface-modified carbon black, for example, superficially oxidized carbon black. Alternatively, and/or additionally, the pigment dispersion may contain dispersing agents for stabilization, specifically polymer dispersing agents. Suitable dispersing agents are, among others, acrylate-styrol-block-copolymers, pyrolidon-acrylate-block-copolymers and similar. When pigment dispersion exists, the term "coloring agents" within the scope of the present invention is to mean the totality of pigment particles, dispersing agents and, possibly, additional adjuvants.

In a micro-emulsion, a solvent-soluble dye is present in dissolved state in a solvent, which is not miscible with the ink medium. The dye solution is highly emulsified in the ink medium. Droplet size of dye solution is sufficiently small, so that a stable emulsion results. In general, an emulsifier is required for this purpose, preferably an amphophilic emulsifier. Emulsifiers with carboxylate- and/or sulfonic acid side groups are preferred. When a micro-emulsion exists, the term "coloring agents" within the scope of the present invention is to mean the totality of pigment particles, dispersing agents and, possibly, additional adjuvants.

The term "by precipitation reagent precipitable coloring substance" is to mean a coloring substance which, absent a precipitation reagent, forms a stable molecular solution, dispersion or micro-emulsion in the ink medium, but which is transformed into a compound which is difficult to dissolve.

The precipitation reagent is capable of transforming the precipitable coloring substance (or its color-carrying elements) into a solution which is difficult to dissolve, or capable of causing an agglomeration of the coloring substance (or its color-carrying elements). This can be done in that the precipitation reagent provokes a change in the milieu of the ink medium or causes a chemical change in the precipitable coloring substance or in one of this elements, which leads to a decrease in the solubility or to destabilization of a dispersion or micro-emulsion, or in that the precipitation reagent and the coloring substance enter into a chemical or physical reciprocal action while forming a compound that is difficult to dissolve. The formation of a difficult to dissolve compound prevents migration or diffusion of coloring substances from the application site of the first ink into the neighboring regions, in which the second and/or the third ink has/have been applied.

According to the invention, the precipitation reagent is not contained as such in the second or the third ink, but in temporarily passivated form. "Temporarily passivated form" means that no precipitation reaction occurs upon combination of the precipitable dye and the temporarily passivated precipitation reagent. The precipitation reagent is converted from the temporarily passivated form into the active form by an appropriate activator. It is only in the active form that the precipitation reagent is capable of precipitating the dye. The activator is a compound which activates the temporarily passivated precipitation reagent. This may be done, for example, by increasing the load of the precipitation reagent, reversing the load of the precipitation reagent or by displacement of the precipitation reagent from the complex. It is critical that the temporarily passivated precipitation reagent and the activator do not exist in the same ink but will come into contact with each other only during the printing action when the respective inks are printed simultaneously or successively on top of each other or immediately next to each other on a substrate.

In one specific embodiment of the invention, the precipitation reagent can be a multi-valent metal cation, for example, $Ca^{2+}$, $Cu^{2+}$, $Ni^{2+}$, $La^{3+}$, $Nd^{3+}$, $y^{3+}$, and $A^{3+}$. Appropriate counter-ions for the named cations can be, for example, $NO_3^-$, $F^-$, $Cl^-$, $Br^-$, $I^-$, $CH_3COO^-$ and $SO^{2-}_4$. For example, calcium-acetate, magnesium-sulfate, magnesium-acetate and aluminum-sulfate may be employed. The multivalent metal cations can precipitate the precipitable dye, i.e., the soluble coloring substance or the electrostatically or electrostatic/steric stabilized pigment dispersion or the micro-emulsion in that they demonstrate high affinity to the water-solubilizing or stabilizing functional groups. The solvatability of these groups is thereby greatly reduced and the dissolved dye or the dispersed pigments lose their water solubility and precipitation occurs. These multivalent metal cations have, at the same time, due to their multiple positive load, high ionic strength. This characteristic additionally promotes the precipitation reaction. Due to the increase in ionic strength, the radius of the Helmholtz double layer decreases and, consequently, the distance between two dispersed particles. If the distance between two particles is reduced below a certain value, these particles agglomerate and the dispersion becomes unstable.

If the precipitation reagent is a multivalent metal cation, the temporary passivation can beneficially occur by complex formation. The multivalent metal cation is released from the complex by the activator. When selecting a complex builder, attention must be paid that the complex with the multivalent metal cation is sufficiently stable, given the ink conditions under which the complexed multivalent metal cation exists, whereas the complex becomes unstable upon entry of the activator contained in the other ink. Suitable complex builders are, for example, EDTA, IDA, CDTA, amino acids, aromatic or heterocyclic amino-carbonic acids, amines, aminophosphates, one or multivalent carbonic acids.

In this case the activator can be a proton-delivering system, like a buffer system with a pH-value of preferably 6 or less or ammonium-ions.

In one specific embodiment, the multivalent cation $M^{x+}$ forms a stable complex with a ligand $L^{y-}$, in other words, the reaction $$M^{x+}+L^{y-}\rightarrow ML^{(x-y)}$$

shows a high complex-building constant, preferably pK>12, specifically >15. With the protonized form of the ligand $HL^{(1-y)}$ the multivalent metal cation, however, does not form a stable complex, in other words, the complex-building constant of the reaction $$M^{x+}+HL^{(1-y)}\rightarrow MHL$$

is small, preferably pK>4, specifically <3.

The ligand is preferably protonized or de-protonized by the smallest possible pH-modification, in other words, the reaction $$L^{y-}+H^{+}\rightarrow HL^{(1-Y)}$$

does not have a pK of preferably between 5 and 9. In another specific embodiment of the invention, the temporarily passivated precipitation reagent is a polyamine. A suitable example for this is ethylene-diamine.

Activation can be done by means of protonizing and/or quaternizing. Accordingly, the activator is preferably a proton-delivery compound, such as, for example, a watery solution, preferably a buffer system, with a pH of 6 or less, ammonium-ions are similar, or another quaternary agent, such as dimethyl-sulfate. By protonizing and/or quaternizing, polycations are produced from the polyamine. These precipitate the coloring substance in that an interlinking takes place via reciprocal effect of the cationic groups of the precipitation reagent with the anionic groups of the coloring substance.

In another specific embodiment of the invention, the temporarily passivated precipitation medium is a compound with pH-dependent ion strength. Compounds with pH-dependent ion strength generally contain one or several protonizeable or de-protonizeable groups. The compound with pH-dependent ion strength preferably contains one or several groups which have been selected from $NH_2$, NHR, $NR_2$, $PO_3H_2$, $PO_3HR$, $PO_3R_2$, $SH_2$, SHR, $SR_2$ $SO_3R$<COOH, —CON and —COS. Particularly preferred is the compound with pH-dependent ion strength, a weak acid, preferably with pKs>6, a weak base, preferably with pKs<9.5, an amino acid or an amino-phosphate. Suitable are, for example, glutamine-acid, morpholinopropansulfon acid (MOPS), tri-hydroxymethyl-aminomethane (TRIS) and Triethanolamine.

The compound with pH-dependent ion strength preferably shows in a first pH, a lower ion-strength and attains a high load by means of the lowest possible pH change. The coloring substance can be precipitated by increase of ion strength. The ion strength at which the precipitation of the coloring substance begins is called critical ion strength. The critical ion strength depends upon the respective coloring substance.

The activator is a proton-delivering or proton-accepting system, preferably a watery solution with a pH which deviates by at least 2, preferably by at least 3 pH-units from the pH-value of the ink which contains the compound with pH-dependent ion strength. The activator can itself constitute a compound with pH-dependent ion strength, which indicates a low ion strength in the pH prevailing in the activator ink. During the mixing, one compound with pH-dependent ion strength always acts as activator upon the other.

In a preferred method according to the invention, the ink, in which the compound with pH-dependent ion strength is present, has a pH which corresponds to an ion strength below the critical ion strength for the precipitation of the coloring substance, and the ink containing the activator has such pH that the mixing of inks, a pH will set in which corresponds to an ion strength of the compound with pH-dependent ion strength, which is above the critical ion strength for the precipitation of the coloring substance. It is particularly preferred that the ink containing the pH-dependent ion strength compound has a low buffering capacity and the ink containing the activator a high buffering capacity. When the inks meet, the pH of the ink with high buffering capacity dominates and thus such total pH value sets in which corresponds to high ion strength and precipitation of the coloring substance occurs.

Particularly beneficial results are obtained if MOPS with a pH of approximately 5.8 is used as temporarily passivated precipitation reagent and triethanolamine is used as activator with a pH of approximately 9.2. The ink containing the named materials both have a conductivity of approximately 25 mS, whereby the conductivity serves as measure for the ion strength. During mixing of inks, a pH of approximately 7.5 sets in and the conductivity rises to approximately 60 mS.

The ink medium is generally watery. It contains water or a mixture of water and one or several water-mixable organic solvents. The selection of a suitable mixture depends upon the requirements of the respective application, such as the desired surface tension, the coloring substance, the drying time and the substrate to be imprinted. An expert is able to determine an appropriate ink medium by means of simple tests.

The invention also concerns an ink set which comprises a first, a second and, optionally, a third ink and which is suitable for implementation of the method according to the invention.

All inks for implementation of the method according to the invention or for the ink set according to the invention contain as a rule—aside from the named materials in form of the precipitable coloring substance, the temporarily passivated precipitation reagent and the activator—additional customary components. Thus, the second and/or the third ink generally contains—aside from the temporarily passivated precipitation reagent or the activator, a coloring substance which is different from the precipitable coloring substance of the first ink. The coloring substance of the second and/or the third ink may itself be a precipitable coloring substance.

The inks can contain solvents such as n-propanol, 1.2-butadiol, 2-isopropyloxyethanol, benzamid, benzyl-alcohol, butyl-diglycol, butyl-glycol, butyl-triglycol, butyrolacton, di-isopropanolamine, di-methylimidazolidanon, di-propyleneglycol-n-propyl-ether, di-propylene-glycol-monobutyl-ether, di-propylene-glycolmomethyl-ether, isopropanol, N,N-butyl-1-ethanolamine, n-butanol, N-methyl-pyrrolidon, polypropylene-glycol, propylene-ethylene-glycol-blockpolymer, propylene-carbonate. They may also contain biocides. The inks may contain emulsifiers, such as dedecylamine, the sodium salt of N-Coco-3-amino-butyric acid, coco-trimethyl-ammonium-chloride, didecyl-methyl-alkoxamoniumpropionate, N-coco-diaminopropane, N-Oleyl-1,3-diaminopropane, N-tallow-1,3-diaminopropane-diolet, etc.—moisteners, such as 1.1.1-trishydroxy-methylpropane, 1.2.6-hexantriol, 1.3-dimethylimidazolidinon, 1.4-butandiol, 1.6-hexandiol, 2-methyl-2,4-pentandiol, 2-hydroxybenzyl-alcohol, 2-pyrrolidon, 5-amino-benzoe acid, etc. thickeners, such as alginic acid, polyvinyl-pyrrlidon-polymers and—copolymers, alginates, polyacrylic acids, etc., —tensides, such as alkyl-phenyl-PEG, PEG-stearyl-ether, alkyl-polyglycosides, alkyl-sulfonates, ethoxylized fatty alcohols, alkylsulfo-propylammonium-betaines, alkyl-phenyl-sulfonates, di-meticonpropolyoles, alkyl-pyrrolidones, etc.

The inkjet printing method according to the invention nor the inkset comprises at least two inks. It may, however, comprise three or more inks, for example, up to six inks. In specific embodiments of more than two, for example, three inks, it is essential that at least two or three inks maintain a functional reciprocal interaction with each other, as described in the preceding. A temporarily passivated precipitation reagent can, following activation, precipitate not only the coloring substance of one ink but also that of another ink. Likewise, can a precipitable coloring substance be precipitated by various precipitation reagents contained in different inks. There may also exist specific embodiments of several inks with independent systems comprising coloring agent/precipitation reagent/activator.

In addition to the extensive improvements with respect to bleeding, a significant benefit of the method according to the invention consists in that high optical density is achieved of the to be precipitated ink. This is preferably the case if the precipitation ink(s) is/are printed beneath the ink with the coloring substance which is to be precipated. With this printing mode, the coloring substance is immediately precipitated when making contact with the to be imprinted substrate and is prevented from penetrating into the medium.

The invention will now be explained in more detail on the basis of some examples:

EXAMPLE 1

This example explains the use of MOPS/triethanolamine as temporarily passivated precipitation reagent or activator. Three test inks are produced according to the following recipes:

Ink #1

| | |
|---|---|
| Cab-o-jet 300 (surface-modified carbon black) | 25% by weight |
| Glycolic acid (pH regulator) | 0.06% by weight |
| Surfadon LP 100 (alkylpyrrolidon, tenside) | 0.03% by weight |
| 2-pyrrolidon (moistener) | 30% by weight |
| Water | 44.91% by weight |

Ink #2

| | |
|---|---|
| 3-morpholinopropansulfonic acid (temporarily passivated precipitation reagent) | 15% by weight |
| Diethylene-glycol (moistener) | 10% by weight |
| Surfynol 465 (tenside) | 0.5% by weight |
| Acticid ST (biocide) | 0.1% by weight |
| Acid red 52 (coloring substance) | 2.5% by weight |
| Triethanolamine (pH regulator) | to pH 5.8 |
| Water | 70.9% by weight |

Ink #3

| | |
|---|---|
| Triethanolamine (Activator) | 5% by weight |
| Diethylene-glycol (moistener) | 10% by weight |
| Surfynol 465 (tenside) | 0.5% by weight |
| Acticid ST (biocide) | 0.1% by weight |
| Direct blue 199 (coloring substance) | 3% by weight |
| 3-morpholino-propansulfonic acid (pH regulator) | to pH 9.2 |
| Water | 81.4% by weight |

Mixtures were prepared from the three test inks according to the following model. The ink was added by drops in each case. Type and speed of precipitation was noted. To that effect, the test vessel was illuminated from the rear.

| Mixture | Type of Precipitation | Speed of Precipitation |
|---|---|---|
| Ink 1 and ink 3 (10:1) | none | — |
| Ink 2 and ink 3 (10:1) | none | — |
| Ink 1, ink 2 and Ink 3 (5:5:1) | fine to coarse | immediately |

EXAMPLE 2

This example explains the use of propylene-diamine as temporarily passivated precipitation reagent with an ammonium-acetate/acetic acid buffer as activator.

Test inks were prepared according to the following recipes:

Ink #1

| | |
|---|---|
| Heucosperse I KS 1720 (Stabilized pigment preparation) | 8% by weight |
| PEG 600 (Moistener) | 2% by weight |
| PEG 1500 (Moistener) | 2% by weight |
| PEG 4000 (Moistener) | 1.2% by weight |
| Surfadon LP 100 (Alkylpyrrolidon, tenside) | 0.2% by weight |
| Urea (Moistener) | 2% by weight |
| N,N dimethyl-urean (Moistener) | 2% by weight |
| Glycerin (Moistener) | 8.3% by weight |
| Acticid ST (biocide) | 0.1% by weight |
| Water | 75.2% by weight |

Ink #2

| | |
|---|---|
| Propylene-diamine (temporarily Passivated precipitation reagent) | 15% by weight |
| Diethylene-glycol (moistener) | 10% by weight |
| Surfynol 465 (tenside) | 0.5% by weight |
| Acticid ST (biocide) | 0.1% by weight |
| Acid red 52 (coloring substance) | 2.5% by weight |
| Reactive red 180 (coloring substance) | 1% by weight |
| Acetic acid (pH regulator) | to pH 9 |
| Water | 70.9% by weight |

Ink #3

| | |
|---|---|
| Ammonium-acetate (activator) | 5% by weight |
| Diethylene-glycol (moistener) | 10% by weight |
| Surfynol (tenside) | 0.5% by weight |
| Acticid ST (biocide) | 0.1% by weight |
| Direct blue 199 (coloring substance) | 3% by weight |
| Acetic Acid (pH regulator) | to pH 5.8 |
| Water | 81.4% by weight |

Mixtures were prepared of the three inks according to the following model. Ink was added by drops in each instance. Type and speed of precipitation was noted. To that effect, the test vessel was illuminated from the rear.

| Mixture | Type of Precipitation | Speed of Precipitation |
| --- | --- | --- |
| Ink 1 and Ink 3 (10:1) | none | — |
| Ink 2 and Ink 3 (10:1) | none | — |
| Ink 1, Ink 2 and Ink 3 (5:5:1) | fine to coarse | immediately |

EXAMPLE 3

This example explains the use of a complex calcium acetate and iminodi-acetic acid as temporarily passivated precipitation reagent with an ammonium acetate/acetic acid buffer as activator.

| Ink #1 | |
| --- | --- |
| Heucosperse I KS 1720 (Stabilized pigment preparation) | 8% by weight |
| PEG 600 (Moistener) | 2% by weight |
| PEG 1500 (Moistener) | 1% by weight |
| PEG 4000 (Moistener) | 1.2% by weight |
| Surfadon LP 100 (Alkylpyrrolidon, tenside) | 0.2% by weight |
| Urea (Moistener) | 2% by weight |
| N,N dimethyl-urea (Moistener) | 2% by weight |
| Glycerin (Moistener) | 8.3% by weight |
| Acticid ST (biocide) | 0.1% by weight |
| Water | 75.2% by weight |
| Ink #2 | |
| Calcium-acetate (precipitation reagent) | 5% by weight |
| Iminodi-acetic acid-sal of di-natrium (Complex builder) | 3.9% by weight |
| Diethylene-glycol (moistener) | 10% by weight |
| Surfynol ST (biocide) | 0.1% by weight |
| Acid red 52 (coloring substance) | 2.5% by weight |
| Reactive red 180 (coloring substance) | 1% by weight |
| Water | 70.9% by weight |
| Ink #3 | |
| Ammonium-acetate (activator) | 5% by weight |
| Diethylene-glycol (moistener) | 10% by weight |
| Surfynol 465 (tenside) | 0.5% by weight |
| Acticid ST (biocide) | 0.1% by weight |
| Direct blue 199 (coloring substance) | 3% by weight |
| Acetic Acid (pH regulator) | to pH 5.8 |
| Water | 81.4% by weight |

Mixtures were prepared of the three inks according to the following model. Ink was added by drops in each instance. Type and speed of precipitation was noted. To that effect, the test vessel was illuminated from the rear.

| Mixture | Type of Precipitation | Speed of Precipitation |
| --- | --- | --- |
| Ink 1 and Ink 3 (10:1) | very small | after hours |
| Ink 2 and Ink 3 (10:1) | none | — |
| Ink 1, Ink 2 and Ink 3 (5:5:1) | coarse | immediately |

Having thus described the invention, it is claimed:

1. Inkjet Printing Method, comprising printing a first, second and optionally a third ink on top of each other or directly next to each other, wherein
   (i) the first ink comprises a coloring substance precipitable by a precipitation reagent,
   (ii) the first or the second ink comprises the precipitation reagent in temporarily passivated form, and
   (iii) the first, second or third ink comprises an activator for the temporarily passivated precipitation reagent, and wherein the temporarily passivated precipitation reagent and the activator are not present in the same ink.

2. Inkjet Printing Method according to claim 1, characterized in that the precipitable coloring substance and the temporarily passivated precipitation reagent are contained in the first ink and the activator is contained in the second ink.

3. Inkjet Printing Method according to claim 1, characterized in that the precipitable coloring substance and the activator are contained in the first ink and the temporarily passivated precipitation reagent is contained in the second ink.

4. Inkjet Printing Method according to claim 1, wherein the first ink comprises the precipitable coloring substance, the second ink comprises the temporarily passivated precipitation reagent, and the optional third ink is present and comprises the activator.

5. Inkjet Printing Method according to claim 1, characterized in that the coloring substance which is precipitable by the precipitation agent is a black coloring substance.

6. Inkjet Printing Method according to claim 1, characterized in that the precipitable coloring substance is a water-soluble coloring agent, an electrostatically or electrostatically/sterically stabilized pigment dispersion or a micro-emulsion.

7. Inkjet Printing Method according to claim 1, characterized in that the temporarily passivated precipitation reagent is a complexed multi-valent metal cation, whereby the multi-valent metal cation can be released from the complex by the activator.

8. Inkjet Printing Method according to claim 7, characterized in that the multi-valent metal cation is $Ca^{2+}$, $Mg^{2+}$ and/or $Al^{3+}$.

9. Inkjet Printing Method according to claim 7, characterized in that the multi-valent metal cation is complexed by a complex builder, selected from IDTA, IDA, CDTA, amino acids, aromatic or heterocyclical amino-carbon acids, amines, amino-phosphates and carbonic acids.

10. Inkjet Printing Method according to claim 7, characterized in that the activator is a buffering system with a pH value of 6 or less.

11. Inkjet Printing Method according to claim 1, characterized in that the temporarily passivated precipitation reagent is a polyamine.

12. Inkjet Printing Method according to claim 11, characterized in that the activator is a watery solution with a pH of 6 or less.

13. Inkjet Printing Method according to claim 1, characterized in that the temporarily passivated precipitation medium is a compound with pH-dependent ion strength.

14. Inkjet Printing Method according to claim 13, characterized in that the compound with pH-dependent ion strength contains one or several protonizeable or deprotonizeable groups.

15. Inkjet Printing method according to claim 14, characterized in that the compound with pH-dependent ion strength contains one or several groups, selected from $NH_2$, $NHR$, $NR_2$, $PO_3H_2$, $PO_3HR$, $PO_3R_2$, $SH_2$, $SHR$, $SR_2$, $SO_3H$, $SO_3R$, $COOH$, $—CON$ and $—COS$.

16. Inkjet Printing Method according to claim 15, characterized in that the compound with pH-dependent ion strength is a weak acid, a weak base, an amino acid or an amino-phosphate.

17. Inkjet Printing Method according to claim 13, characterized in that the activator is a watery solution with a pH which deviates from the pH value of the ink containing the pH-dependent ion strength compound by at least 2 pH units.

18. The method of claim 13, wherein the ink containing the compound with pH-dependent ion strength has a pH value corresponding to an ion strength below the critical ion strength for the precipitation of the coloring substance, and that the ink containing the activator has a pH corresponding to an ion strength above the critical ion strength for precipitation of the coloring substance when the inks are mixed.

19. The method of claim 18, wherein the ink containing the compound with pH-dependent ion strength has a buffering capacity lower than the ink containing the activator.

20. Inkjet set for multicolor inkjet printing, comprising a first, a second and optionally a third ink, wherein (i) the first ink comprises a coloring substance precipitable by a precipitation reagent, (ii) the first or second ink comprises the precipitation reagent in temporarily passivated form, and (iii) the first, second, or third ink comprises an activator for the temporarily passivated precipitation reagent, and wherein the temporarily passivated precipitation reagent and the activator are not present in the same ink.

* * * * *